United States Patent
Swiler et al.

(10) Patent No.: US 10,730,779 B2
(45) Date of Patent: Aug. 4, 2020

(54) GLASS MANUFACTURING APPARATUS AND RELATED PROCESSES

(71) Applicant: Owens-Brockway Glass Container Inc., Perrysburg, OH (US)

(72) Inventors: Daniel R Swiler, Maumee, OH (US); Dale A Gaerke, Perrysburg, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 0 days.

(21) Appl. No.: 14/841,804

(22) Filed: Sep. 1, 2015

(65) Prior Publication Data

US 2017/0057855 A1    Mar. 2, 2017

(51) Int. Cl.
| | | |
|---|---|---|
| *C03B 5/237* | (2006.01) | |
| *C03B 5/435* | (2006.01) | |
| *C03B 5/183* | (2006.01) | |
| *C03B 5/12* | (2006.01) | |
| *C03B 5/173* | (2006.01) | |
| *C03B 5/225* | (2006.01) | |
| *C03B 5/187* | (2006.01) | |
| *C03B 5/02* | (2006.01) | |

(52) U.S. Cl.
CPC .............. *C03B 5/237* (2013.01); *C03B 5/021* (2013.01); *C03B 5/12* (2013.01); *C03B 5/173* (2013.01); *C03B 5/183* (2013.01); *C03B 5/187* (2013.01); *C03B 5/2252* (2013.01); *C03B 5/435* (2013.01)

(58) Field of Classification Search
CPC ........... C03B 5/237; C03B 5/12; C03B 5/435; C03B 5/2252; C03B 5/021; C03B 5/173; C03B 5/187; C03B 5/183
See application file for complete search history.

(56) References Cited

U.S. PATENT DOCUMENTS

| | | | | |
|---|---|---|---|---|
| 3,429,684 A | * | 2/1969 | Plumat | C03B 3/00 65/135.9 |
| 3,489,547 A | * | 1/1970 | Plumat | C03B 5/12 65/135.2 |
| 3,519,412 A | * | 7/1970 | Olink | C03B 5/12 373/28 |
| 3,532,483 A | * | 10/1970 | Cardot | C03B 3/00 65/136.2 |
| 3,617,234 A | | 11/1971 | Hawkins et al. | |
| 3,712,597 A | | 1/1973 | Waitkus et al. | |
| 3,771,988 A | | 11/1973 | Starr | |
| 3,801,297 A | | 4/1974 | Toussaint et al. | |

(Continued)

FOREIGN PATENT DOCUMENTS

| | | |
|---|---|---|
| DE | 10200232 | 1/2003 |
| DE | 10200233 C1 | 4/2003 |
| EP | 0599403 A2 | 6/1994 |

OTHER PUBLICATIONS

International Search Report and Written Opinion, Int. Application No. PCT/US2016/045476, Int. Filing Date: Aug. 4, 2016, Applicant: Owens-Brockway Glass Container Inc., dated Nov. 14, 2016.

*Primary Examiner* — Queenie S DeHghan

(57) ABSTRACT

An apparatus for manufacturing glass includes radially inner and outer flaw channels physically separated from each other by a common wall that allows heat transfer to occur between molten glass flowing through the outer flow channel and molten glass flowing in the opposite direction through the inner flow channel.

5 Claims, 1 Drawing Sheet

(56) References Cited

U.S. PATENT DOCUMENTS

| | | |
|---|---|---|
| 3,801,411 A | 4/1974 | Brichard |
| 4,147,332 A | 4/1979 | Kotaro et al. |
| 4,153,438 A | 5/1979 | Stream |
| 4,184,861 A | 1/1980 | Erickson et al. |
| 4,285,717 A | 8/1981 | Novak |
| 4,285,718 A | 8/1981 | Mathias et al. |
| 4,303,434 A | 12/1981 | Rough, Sr. et al. |
| 4,306,899 A | 12/1981 | Richards |
| 4,311,502 A | 1/1982 | Propster |
| 4,330,315 A | 5/1982 | Nelson et al. |
| 4,353,726 A | 10/1982 | Rough, Sr. |
| 4,504,302 A | 3/1985 | Carman |
| 4,655,436 A | 8/1987 | Williams |
| 4,727,930 A | 3/1988 | Bruckner et al. |
| 4,831,633 A | 5/1989 | Argent |
| 4,840,226 A | 6/1989 | Richlen |
| 4,875,919 A | 10/1989 | DeSaro et al. |
| 4,994,099 A | 2/1991 | Boettner |
| 5,125,943 A | 6/1992 | Cole |
| 5,399,181 A | 3/1995 | Sorg |
| 5,526,580 A | 6/1996 | Zippe et al. |
| 5,609,661 A | 3/1997 | Moreau et al. |
| 5,741,342 A | 4/1998 | Alexander |
| 7,454,925 B2 | 11/2008 | DeAngelis |
| 8,056,366 B2 | 11/2011 | Kobayashi et al. |
| 2007/0227191 A1 | 10/2007 | Kobayashi et al. |
| 2012/0285201 A1 | 11/2012 | Meyer et al. |
| 2013/0111955 A1* | 5/2013 | Leidy .................... C03B 5/2252<br>65/134.2 |
| 2014/0260433 A1 | 9/2014 | Dewet-Smith et al. |

* cited by examiner

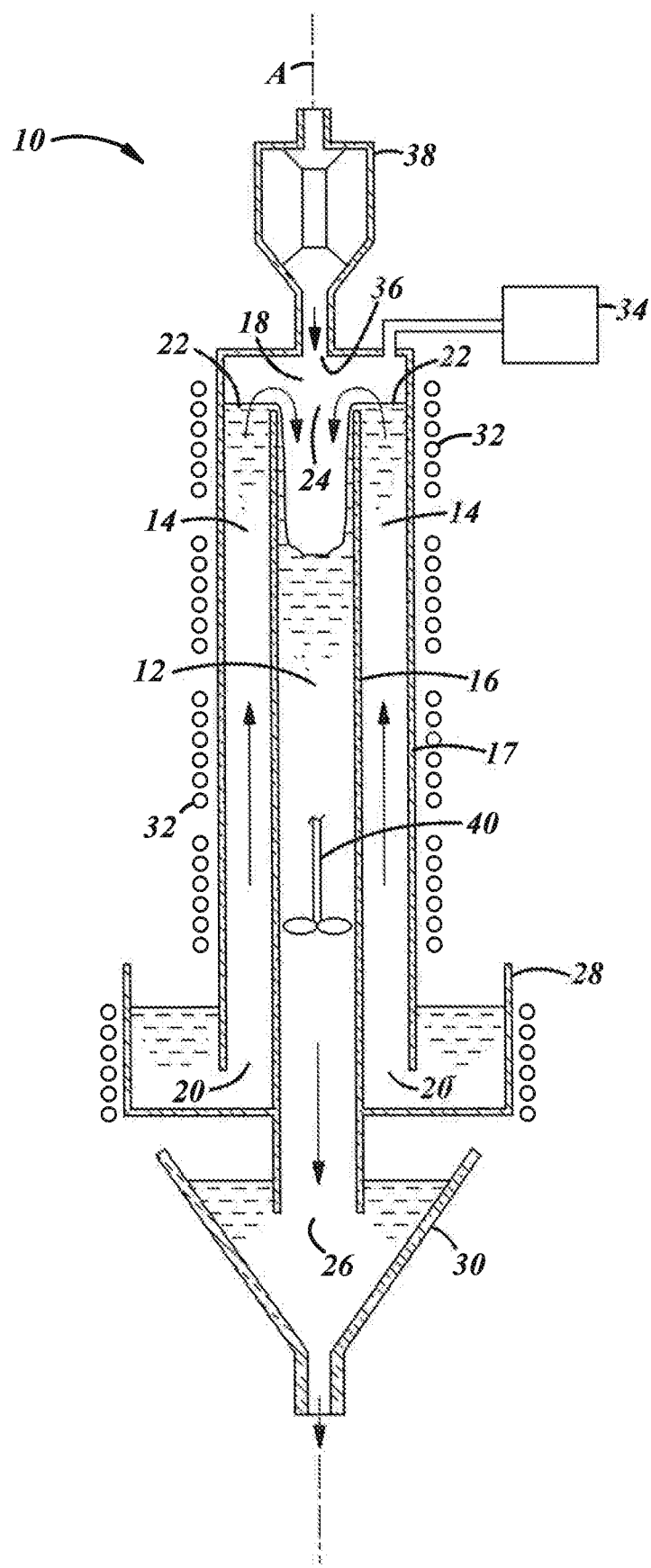

GLASS MANUFACTURING APPARATUS AND RELATED PROCESSES

The present disclosure is directed to an apparatus for manufacturing glass and processes associated therewith, including various glass melting, refining, and/or heat conditioning processes.

BACKGROUND AND SUMMARY OF THE DISCLOSURE

Silica-based, glass, such as soda-lime-silica glass, is prevalent in the manufacture of glass containers and other articles. Molten glass used to make such articles is conventionally prepared by inching a mixture of glass-forming materials known as a batch in a continuous tank furnace. The resulting molten glass typically contains an undesirable amount of gas bubbles which need to be removed. The process of removing gas bubbles from molten glass is commonly referred to as "refining," and typically involves maintaining the molten glass at a relatively high temperature for a sufficient duration to allow the gas bubbles in the molten glass to rise to a free surface thereof and escape. After the glass has been refined it is typically conditioned by reducing the temperature of the molten glass to a suitable temperature for use in downstream glass forming operations where the molten glass may be formed into glass containers and other products.

A general object of the present disclosure, in accordance with one aspect of the disclosure, is to provide a process for manufacturing glass in which excess heat applied to the molten glass during an upstream stage of the process is subsequently recovered in a downstream stage of the process. For example, excess heat applied to the molten glass during the melting and/or refining stages of the glass manufacturing process may be subsequently recovered from the molten glass during the conditioning stage and used to heat another stream of molten glass or to melt additional glass-forming materials. An apparatus is also provided that is configured to carry out such processes.

The present disclosure embodies a number of aspects that can be implemented separately from or in combination with each other.

An apparatus for manufacturing glass in accordance with an aspect of the disclosure includes: a first end and an opposite second end, an inlet for receiving molten glass, an outlet for discharging molten glass, a radially inner flow channel extending between the first and second ends, a radially outer flow channel in fluid communication with the inner flow channel, and an opening for receiving one or more solid glass-forming materials and for introducing the glass-forming materials into molten glass that is flowing within one of the inner or outer flow channels or between the inner and outer flow channels. The inner and outer flow channels are physically separated from each other by a common wall that is configured to allow heat transfer to occur between molten glass flowing through the inner flow channel and molten glass flowing in the opposite direction through the outer flow channel.

In accordance with an aspect of the disclosure, there is provided a process for manufacturing glass including: (a) providing a glass precursor composition, (b) heating the glass precursor composition to a first temperature as the precursor composition flows through a first flow channel in a first direction, (c) removing gas bubbles from the glass precursor composition, (d) flowing the glass precursor composition from the first flow channel into a second flow channel, (e) introducing one or more glass-forming materials into the glass precursor composition to form a final glass composition having a second temperature lower than the first temperature, and (f) flowing the final glass composition through a second flow channel in a second direction opposite the first direction. The one or more glass-forming materials are introduced into the glass precursor composition in step (e) such that excess heat is transferred from the glass precursor composition to the one or more glass-forming materials to dissolve the one or more glass-forming materials into the glass precursor composition and form the final glass composition. When the final glass composition flows through the second flow channel in step (f), heat is transferred by conduction through a common wall physically separating the first and second flow channels from each other and countercurrent heat exchange occurs between the glass compositions flowing in opposite directions through the first and second flow channels.

In accordance with an aspect of the disclosure, there is provided a process for manufacturing glass including: (a) providing a plurality of solid glass batch materials in amounts according to a final desired glass batch composition, (b) heating at least a portion of the plurality of solid glass batch materials as the materials flow through a first flow channel in a first direction to produce molten glass, (c) flowing the molten glass from the first flow channel into a second flow channel, and (d) flowing the molten glass through the second flow channel in a second direction opposite the first direction. Heat is transferred by conduction through a common wall radially separating the first and second flow channels from each other and countercurrent heat exchange occurs between the glass batch materials and the molten glass flowing in opposite directions through the first and second flow channels.

In accordance with an aspect of the disclosure, there is provided a process for manufacturing glass including: (a) flowing unrefined molten glass through a first flow channel in a first direction, (b) heating the unrefined molten glass to a first temperature as the molten glass flows through the first flow channel, (c) removing gas bubbles from the unrefined molten glass to produce refined molten glass, and (d) flowing the refined molten glass through a second flow channel in a second direction opposite the first direction. When the refined molten glass flows through the second flow channel in step (d), heat is transferred by conduction through a common wall radially separating the first and second flow channels from each other and countercurrent heat exchange occurs between the molten glass flowing in opposite directions through the first and second flow channels.

BRIEF DESCRIPTION OF THE DRAWINGS

The disclosure, together with additional objects, features, advantages and aspects thereof, will be best understood from the following description, the appended claims and the accompanying drawing(s), in which:

FIG. 1 is a schematic illustration of a side sectional view of an apparatus for manufacturing glass in accordance with an illustrative embodiment of the present disclosure.

DETAILED DESCRIPTION

FIG. 1 illustrates an apparatus for manufacturing glass in accordance an illustrative embodiment of the present disclosure. In some embodiments, the apparatus 10 may be used in the manufacture of various silica-based glass compositions, including, for example, soda-lime-silica glass. A conventional soda-lime-silica glass composition may include 60-75 wt. % $SiO_2$, 7-15 wt. % $Na_2O$, 6-12 wt, % CaO, and less than 5 wt. % other minor ingredients. More specifically, a conventional soda-lime-silica glass composition may include: 70-75 wt. % $SiO_2$, 12-14 wt. % $Na_2O$, 10-12 wt. % CaO, 0.1-3 wt. % $Al_2O_3$, 0-2 wt. % MgO, 0-2 wt. % $K_2O$, and less than 1.0 wt. % other minor ingredients.

The apparatus 10 has first and second ends, and a longitudinal axis A extending from the first end to the second end thereof. Radially inner and outer flow channels 12, 14 extend along the longitudinal axis A and are defined by a radially inner common wall 16 and a radially outer wall 17. Each of the inner and outer walls 16, 17 has an interior surface and an exterior surface, with the exterior surface of the common wall 16 facing the interior surface of the outer wall 17.

The common wall 16 radially separates the inner and outer flow channels 12, 14 from each other and allows heat transfer to occur between molten glass flowing through the inner flow channel 12 and molten glass flowing in the opposite direction through the outer flow channel 14. In the embodiment illustrated in FIG. 1, a communication chamber or passageway 18 fluidly connects the inner and outer flow channels 12, 14 to each other so that molten glass can flow therebetween. In other embodiments, fluid communication may be established between the inner and outer flow channels 12, 14 by direct connection of the inner flow channel 12 to the outer flow channel 14, or by any other suitable type of direct or indirect connection.

The longitudinal axis A of the apparatus 10 illustrated in FIG. 1 is oriented in a generally vertical direction. However, in other embodiments, the longitudinal axis A of the apparatus 10 may be inclined at a non-zero angle relative to a vertical axis. In some embodiments, the longitudinal axis A of the apparatus 10 may be oriented in a generally horizontal direction.

The inner and outer flow channels 12, 14 may be concentric, with the outer flow channel 14 concentrically surrounding the inner flow channel 12. In such case, the inner and outer flow channels 12, 14 may have central longitudinal axes that are substantially coaxial with each other. The central longitudinal axes of the inner and outer flow channels 12, 14, however, may or may not be coaxial with the longitudinal axis A of the apparatus 10.

The outer flow channel 14 has an upper end, a lower end, an inlet 20 adjacent to its lower end for receiving molten glass, and an outlet 22 adjacent to its upper end for discharging molten glass therefrom. In addition, the inner flow channel 12 has an upper end, a lower end, an inlet 24 adjacent to its upper end for receiving molten glass from the outer flow channel 14 via the passageway 18, and an outlet 26 adjacent to its lower end for discharging molten glass therefrom. As such, the inner and outer flow channels 12, 14 are fluidly connected to each other at their upper ends via the passageway 18, with the outlet 22 of the outer flow channel 14 being in fluid communication with the inlet 24 of the inner flow channel 12. A supply vessel 28 may be located at the lower end of the outer flow channel 14, for supplying molten glass to the outer flow channel 14, and a distribution vessel 30 may be located at the lower end of inner flow channel 12 for receiving molten glass from the inner flow channel 12 and for distributing the molten glass to a downstream process step. The molten glass received at the inlet 20 of the outer flow channel 14 may have a glass composition that is the same as or different from the final desired glass composition.

In operation, molten glass is received at the inlet. 20 of the outer flow channel 14 and is flowed up the outer flow channel 14 toward the outlet 22. Thereafter, the molten glass is transferred from the outlet 22 of the outer flow channel 14 to the inlet 24 of the inner flow channel 12 via the passageway 18. The molten glass received at the inlet 24 of the inner flow channel 12 gradually descends from the upper end to the lower end of the inner flow channel 12 and is discharged therefrom via the outlet 26.

A heater 32 is used to heat the molten glass as it flows from the inlet 20 to the outlet 22 of the outer flow channel 14 and also may be used to heat the molten glass flowing through the passageway 18. In the embodiment illustrated in FIG. 1, the heater 32 comprises an induction coil and is used to inductively heat the molten glass as it flows from the inlet 20 to the outlet 22 of the outer flow channel 14. However, in other embodiments, the molten glass may be heated, e.g., by electric resistance, heat of combustion, or by any other suitable means. Also, the molten glass may be heated directly or indirectly by thermal conduction or convection, for example, by heating the apparatus 10.

In some embodiments, unrefined molten glass containing an undesirable amount of gas bubbles is received at the inlet 20 of the outer flow channel 14, and refined molten glass is discharged from the outlet 26 of the inner flow channel 12. The unrefined molten glass is heated as it flows from the lower end to the upper end of the outer flow channel 14 to promote the release of gas bubbles therefrom. Gas bubbles are released from the molten glass as it passes through the passageway 18 and flows from the outer flow channel 14 to the inner flow channel 12.

The unrefined molten glass may be heated within the outer flow channel 14 such that the temperature of the molten glass is relatively high at the upper end of the outer flow channel 14, as compared to the temperature of the molten glass at the lower end of the outer flow channel 14. For example, the molten glass received at the inlet 20 of the outer flow channel 14 may have a temperature in the range of 740 degrees Celsius to 1500 degrees Celsius, including all ranges and subranges therebetween. The molten glass may be heated as it flows from the lower end to the upper end of the outer flow channel 14 so that it has a temperature in the range of 1050 degrees Celsius to 1800 degrees Celsius, including all ranges and subranges therebetween, by the time it reaches the outlet 22 of the outer flow channel 14. The desired temperature of the molten glass at the inlet 20 and the outlet 22 of the outer flow channel 14 may depend, for example, on the composition of the molten glass. The molten glass at the outlet 22 of the outer flow channel 14 may be "superheated," meaning that the molten glass may be at a high enough temperature for its viscosity to be reduced to a sufficiently low level so that gas bubbles within the molten glass may more rapidly rise through the molten glass and escape. In one specific example, the molten glass may be superheated to a temperature above 1550 degrees Celsius by the time it reaches the outlet 22 of the outer flow channel 14.

A vacuum pump and evacuation system 34 may be coupled to the passageway 18 and/or to the outlet 22 of the outer flow channel 14 to create a sub-atmospheric pressure environment within the passageway 18 and/or within the upper end of the outer flow channel 14, which may encourage gas bubble release from the molten glass. Also, the vacuum pump and evacuation system 34 may create a pressure differential between the inlet 20 and the outlet 22 of the outer flow channel 14, which may encourage molten glass to flow from the inlet 20 to the outlet 22 of the outer flow channel 14. In some other embodiments, a pressure differential may be established between the inlet 20 and the outlet 22 of the outer flow channel 14 by creating a relatively high pressure environment within the supply vessel 28. In other embodiments, the pressure at the inlet 20 and the outlet 22 of the outer flow channel 14 may be substantially equal.

The apparatus 10 is configured so that countercurrent heat exchange can occur between the molten glass flowing through the outer flow channel 14 and the molten glass flowing in the opposite direction through the inner flow channel 12. In particular, the common wall 16 between the inner and outer flow channels 12, 14 is constructed so that heat from the molten glass flowing through one of the channels 12, 14 may be transferred by conduction through the common wall 16 to the molten glass flowing in the opposite direction through the other flow channel 12, 14.

For example, heat from the molten glass flowing through the outer channel 14 may be transferred by conduction through the common wall 16 to the molten glass flowing in the opposite direction through the inner flow channel 12. Such heat transfer allows for at least a portion of the excess heat (or energy) that was applied to the molten glass flowing through the outer flow channel 14 to be recovered or reclaimed by using it to heat the molten glass flowing through the inner flow channel 12.

The common wall 16 separating the inner and outer flow channels 12, 14 may be made from any suitable material that allows countercurrent heat exchange to occur between the molten glass flowing through the inner and outer flow channels 12, 14. For example, the common wall 16 may be made of any suitable refractory material that is thermally conductive and capable of withstanding the high temperature, corrosive environments typically encountered in glass melting furnaces. Examples of some suitable refractory materials include molybdenum, tungsten, platinum, iridium, alloys of molybdenum, tungsten, platinum or iridium, and carbides of tungsten and silicon. A suitable thickness for the common wall 16 may be in the range of 1 mm to 30 mm, including all ranges and subranges therebetween. In some embodiments, the common wall 16 may be removably coupled to the rest of the apparatus 10 for easy assembly and/or inspection thereof. In some embodiments, the apparatus 10 may be run under reducing or inert conditions to help reduce or prevent corrosion and/or erosion of the common wall 16 when in contact with oxidizing compounds.

In some embodiments, a molten glass precursor composition may be supplied to the apparatus 10 at the lower end of the outer flow channel 14 via the supply vessel 28 and one or more glass-forming materials may be introduced into the glass precursor composition as it flows from the outer flow channel 14, through the passageway 18, and/or into the inner flow channel 12 to produce a final glass composition at the outlet 26 of the inner flow channel 12. As shown in FIG. 1, the passageway 18 at the upper ends of the inner and outer flow channels 12, 14 may include an opening 36 through which one or more glass-forming materials are received from a hopper 38 and introduced into the glass precursor composition to form a mixture. The hopper 38 may be located above the passageway 18 and above the upper ends of the inner and outer flow channels 12, 14 so that the one or more glass-forming materials can fall by gravity from the hopper 38, through the opening 36, and into the glass precursor composition. A stirrer 40 may be located in the inner flow channel 12, and optionally in the passageway 18, to help mix the one or more glass-forming materials into the glass precursor composition to produce a substantially homogenous glass composition.

The one or more glass-forming materials may have substantially the same composition as the glass precursor composition. In such case, the one or more glass-forming materials may be melted into the glass precursor composition to form a final glass composition that has substantially the same composition as that of the glass precursor composition. In other embodiments, the composition of the one or more glass-forming materials may be somewhat different from the glass precursor composition. In such case, the one or more glass-forming materials may be melted and homogenized with the glass precursor composition to form a final glass composition that has a different composition than the glass precursor composition. For example, the glass precursor composition received at the inlet 20 of the outer flow channel 14 may contain a relatively low amount of silica ($SiO_2$) and the one or more glass-forming materials may contain a relatively high amount of silica ($SiO_2$), as compared to the amount of silica in the final glass composition. In one specific example, the glass precursor composition received at the inlet 20 of the outer flow channel 14 may contain between 0 wt. % and 60 wt, % silica ($SiO_2$), including all ranges and subranges therebetween.

The one or more glass-forming materials may comprise any material or combination of materials that can be incorporated into the glass precursor composition to form a final glass composition. For example, the one or more glass-forming materials may include sand, cullet (recycled glass), or a mixture thereof. A presently preferred glass-forming material may be a silica-containing material that contains between 50 wt. % and 100 wt. % silica ($SiO_2$), including all ranges and subranges therebetween. Such a material may be formed from a mixture of 10-80 wt. % sand and 20-90 wt. % cullet, including all ranges and subranges therebetween. The one or more glass-forming materials may be introduced into the glass precursor composition in any suitable solid or liquid form. In some embodiments, the one or more glass-forming materials may be introduced into the glass precursor composition in the form of a powder having a mean particle diameter in the range of 1 micron to 10 cm.

The one or more glass-forming materials may be introduced into the glass precursor composition at a relatively low temperature, as compared to the temperature of the glass precursor composition itself. For example, the one or more glass-forming materials may be in solid form and may be at a temperature in the range of 20 degrees Celsius to 400 degrees Celsius, including all ranges and subranges therebetween, when such materials are introduced into the molten glass precursor composition. In such case, when the one or more glass-forming materials are introduced into the glass precursor composition, heat from the molten glass precursor composition will necessarily be transferred to the solid glass-forming materials. Such heat transfer will necessarily lower the temperature of the glass precursor composition and will preferably melt and dissolve the glass-forming materials into the glass precursor composition. In addition, such heat transfer between the glass precursor composition and the one or more glass-forming materials allows for an additional portion of the excess heat that was applied to the glass precursor composition in an upstream stage of the process to be recovered or reclaimed. Such heat transfer also may help condition the glass, for example, by lowering the temperature of the molten glass to a suitable temperature for use in downstream glass forming operations, e.g., about 1000 degrees Celsius to about 1250 degrees Celsius, including all ranges and subranges therebetween.

The one or more solid glass-forming materials may gradually melt and dissolve into the molten glass precursor composition as the mixture descends from the upper end to the lower end of the inner flow channel 12 to produce a substantially homogenous final glass composition at the outlet 26 of the inner flow channel 12. However, the specific point between the upper end and the lower end of the inner flow channel 12 at which a substantially homogenous glass composition is achieved may vary, for example, depending upon the amount of glass-forming materials that are introduced into the glass precursor composition and the temperature of the glass precursor composition, as well as the temperature of the glass-forming materials themselves. The length of the inner flow channel 1 may be selected to ensure sufficient interaction time occurs between the glass-forming materials and the glass precursor composition so that a substantially homogenous molten glass composition is achieved at the outlet 26 of the inner flow channel 12. In addition, the length of the inner flow channel 12 may be tailored to accommodate a desired pressure differential between the inlet 20 and the outlet 22 of the outer flow channel 14. A suitable length for the inner flow channel 12, measured from the inlet 24 to the outlet 26 thereof, may be in the range of 4.2 meters to 1.1 meters, including all ranges and subranges therebetween.

In some embodiments, solid, glass forming materials (or glass batch materials) may be received at the inlet 20 of the outer flow channel 14 and molten glass having a final desired glass composition may be discharged from the outlet 26 of the inner flow channel 12. In such case, the solid glass batch materials may be heated as they are transferred through the outer flow channel 14, from the first end to a second or upper end of the outer flow channel 14. The glass batch materials may be heated as they are transferred through the outer flow channel 14 to initiate various chemical reactions and/or to initiate melting of the glass batch materials. For example, the glass batch materials may be heated as they are transferred through the outer flow channel 14 to initiate certain decomposition reactions, which may result in the production of one or more gaseous reaction products, e.g., carbon dioxide ($CO_2$).

The solid glass batch materials received at the inlet 20 of the outer flow channel 14 may include substantially all of the materials needed to produce the final desired glass composition. In such case, the solid glass batch materials may be heated as they are transferred through the outer flow channel 14 to melt the glass batch materials and produce a flow of molten glass at the outlet 22 of the outer flow channel 14. Thereafter, the as-produced molten glass may flow from the outer flow channel 14, through the passageway 18, and into the inner flow channel 12 via the inlet 24. Heat may be continuously transferred through the common wall 16 between the glass batch materials passing through the outer flow channel 14 and the molten glass flowing in the opposite direction through the inner flow channel 19.

In some cases, the solid glass batch materials received at the inlet 20 of the outer flow channel 14 may only include a portion of the materials needed to produce the final desired glass composition. For example, a first portion of the materials needed to produce the final desired glass composition may be received at the inlet 20 of the outer flow channel 14, and a second portion of the materials needed to produce the final desired glass composition may be supplied to the passageway 18 via the opening 36. In such case, the first portion of the materials may be heated as the first portion is transferred through the outer flow channel 14 to melt the first portion and produce a glass precursor composition at the outlet 22 of the outer flow channel 14. The glass precursor composition may flow from the outer flow channel 14, through the passageway 18, and into the inner flow channel 12, and the second portion of the materials may be introduced into the glass precursor composition as it flows from the outer flow channel 14, through the passageway 18, and/or into the inner flow channel 12 to produce a final glass composition at the outlet 26 of the inner flow channel 12. Heat may be continuously transferred through the common wall 16 between the glass batch materials passing through the outer flow channel 14 and the molten glass flowing in the opposite direction through the inner flow channel 12.

There thus has been disclosed an apparatus and a process for melting, refining and heat conditioning glass, that fully satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. In addition, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A process for manufacturing soda-lime-silica glass containing 60-75 wt. % $SiO_2$, including:
   (a) providing a molten glass precursor composition comprising less than 40 wt % silica ($SiO_2$) in a supply vessel in communication with an inlet of a lower end of a first flow channel, wherein the molten glass precursor composition at the inlet of the first flow channel has a temperature in the range of 740 degrees Celsius to 1500 degrees Celsius;
   (b) heating the molten glass precursor composition to a first temperature above 1550 degrees Celsius as the molten glass precursor composition flows up through the first flow channel;
   (c) removing gas bubbles from the molten glass precursor composition;
   (d) flowing the molten glass precursor composition from an outlet at an upper end of the first flow channel into an inlet at an upper end of a second flow channel via a passageway connecting the first and second flow channels, wherein the first and second flow channels comprise concentric outer and inner flow channels, respectively, with the first flow channel concentrically surrounding at least a portion of the second flow channel;
   (e) introducing one or more solid glass-forming materials into the molten glass precursor composition via an inlet to the passageway such that excess heat is transferred from the molten glass precursor composition to the one or more solid glass-forming materials to dissolve the one or more solid glass-forming materials into the molten glass precursor composition and form a final glass composition having a second temperature lower than the first temperature and having a different chemical composition than that of the molten glass precursor composition, wherein the one or more solid glass-forming materials contains greater than 60 wt. % silica (SiO2) including 10-80 wt % sand and 20-90 wt % cullet; and
   (f) flowing the final glass composition down through the second flow channel such that heat is transferred by conduction through a common wall radially separating the first and second flow channels from each other and countercurrent heat exchange occurs between the glass compositions flowing in opposite directions through the first and second flow channels, wherein the final glass composition is cooled in said steps (e) and (f) to a temperature in the range of 1000 degrees Celsius to 1250 degrees Celsius.

2. The process set forth in claim 1 including establishing a pressure differential between an inlet and an outlet of the first flow channel such that the glass precursor composition flows through the first flow channel from the inlet to the outlet thereof, using a vacuum pump and evacuation system in communication with the passageway.

3. The process set forth in claim 1 wherein the final glass composition is cooled in steps (e) and (f) to a suitable temperature for subsequent processing steps.

4. The process set forth in claim 1 wherein the common wall is composed of one or more of the following materials: molybdenum, tungsten, platinum, or iridium, alloys of molybdenum, tungsten, platinum, or iridium, or carbides of tungsten and silicon.

5. The process set forth in claim 1 wherein the process is run under reducing or inert conditions.

* * * * *